Nov. 3, 1931.  E. A. HOLMGREN  1,830,605
CONTROLLING MECHANISM
Original Filed April 13, 1925  3 Sheets-Sheet 1

INVENTOR
Eric A. Holmgren
By his Attorney,
Nelson W. Howard

Nov. 3, 1931.   E. A. HOLMGREN   1,830,605
CONTROLLING MECHANISM
Original Filed April 13, 1925   3 Sheets-Sheet 2

INVENTOR.
Eric A. Holmgren
By his Attorney,
Wilson Howard

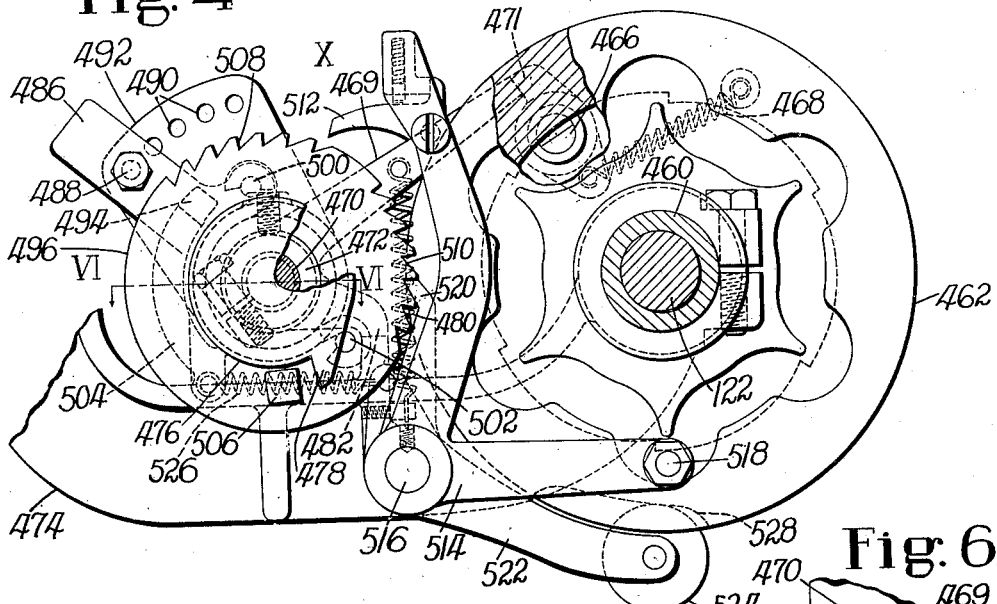
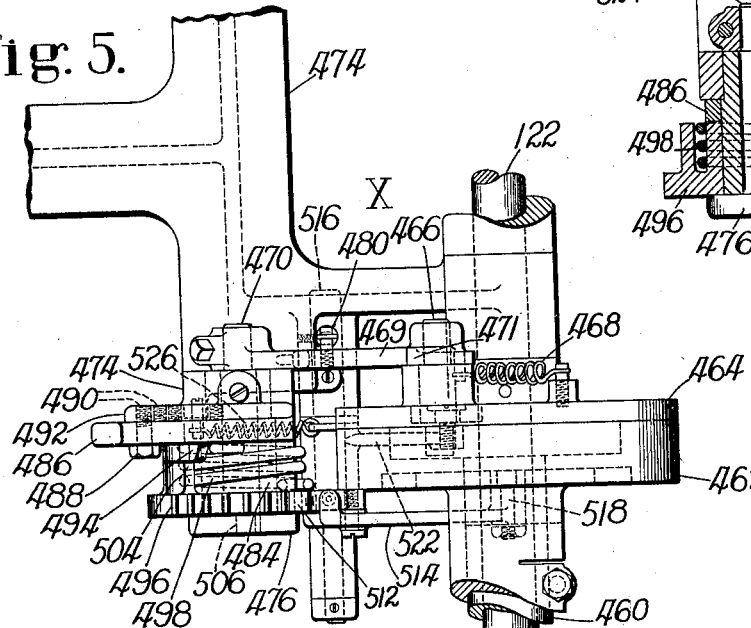
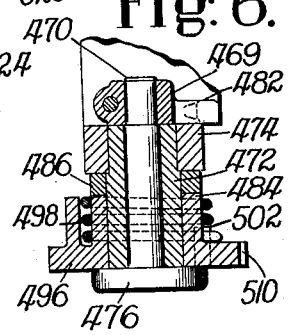

Patented Nov. 3, 1931

1,830,605

UNITED STATES PATENT OFFICE

ERIC A. HOLMGREN, OF LYNN, MASSACHUSETTS, ASSIGNOR TO UNITED SHOE MACHINERY CORPORATION, OF PATERSON, NEW JERSEY, A CORPORATION OF NEW JERSEY

CONTROLLING MECHANISM

Original application filed April 13, 1925, Serial No. 22,624. Divided and this application filed May 13, 1930. Serial No. 451,934.

This invention concerns mechanisms for controlling the operation of machines and the length of time during which such operation continues. It is herein disclosed in connection with an apparatus for manufacturing composite insoles for shoes, which apparatus is made the subject of an application for Letters Patent filed in my name in the United States Patent Office on April 13, 1925, bearing the Serial No. 22,624, and of which the present case is a division. This particular utilization of my invention is but one of a number for which it is adapted.

An object of the invention is to maintain operating means in action for a definite time, for the purpose, for example, of applying to layers of insole-material with an interposed adhesive a proper assembling pressure. I achieve this object by the employment of rotatable connecting mechanism, as a clutch, with a disconnecting member acting thereon, together with means arranged to free the connecting mechanism from the disconnecting member after a predetermined interval. By the successive disconnection and connection of the clutch, the pressure operation is respectively initiated and terminated. The freeing of the connecting mechanism may be accomplished by ratchet mechanism. Preferably, I provide means for varying the time of action of the controlling mechanism, the means herein shown being adapted to change the relation of an element of the ratchet mechanism.

In the accompanying drawings illustrating a particular employment of the invention, Fig. 1 shows in front elevation a machine including my improved controlling mechanism;

Fig. 4 shows the time-controlling mechanism in side elevation;

Fig. 5 is a top plan view of said mechanism; and

Fig. 6, a horizontal sectional detail on the line VI—VI of Fig. 4.

Figure 1:
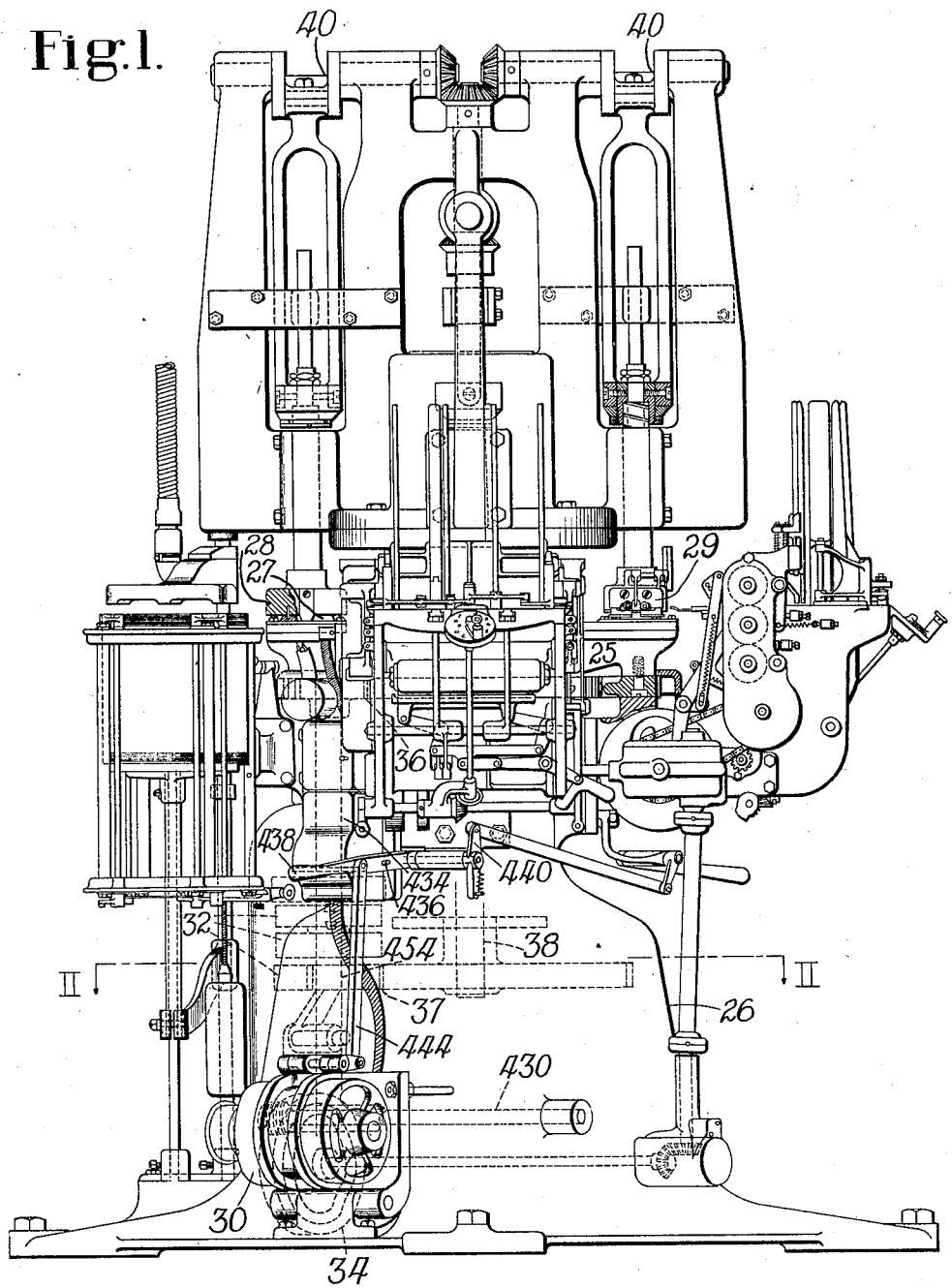

A turret 25, rotatable about a vertical axis upon a frame 26, carries four lower combined rib-forming and assembling dies 27 successively separated about the turret by angles of 90 degrees and having their work-receiving faces in substantially horizontal planes. Arranged to reciprocate vertically upon the frame above the turret are four dies for co-operation with the dies 27, one pair 28, 28 being for the purpose of forming ribs in fabric portions which are included in the soles, while a pair 29, 29 act to press the thus formed elements and leather portions together to complete the soles. But one of each of the pairs 27, 28 and 27, 29 appears in Fig. 1 of the drawings. The dies 28, 28 are of such contour as to operate, respectively, upon right and left soles. The dies 29, 29 are similarly arranged for the formation of the respective soles of a pair. The corresponding dies, that is, the rights and lefts of the two pairs, are separated from each other by 180 degrees, those of each pair being 90 degrees apart. The co-operating dies 27 are in a like manner arranged in pairs of rights and lefts. Carried at the lower portion of the frame is a motor 30, shown in the present instance as electric, which supplies power through clutch mechanism 32 controlled by cam mechanism 34 to alternately rotate the turret through 180 degrees, so that the pairs of dies 27, consisting of a right and a left, are successively presented for co-operation with the dies 28 and 29, and to reciprocate these last-mentioned dies to produce their forming and assembling effects. When the turret is in motion, the upper dies are at rest, and when the travel of the turret ceases, the reciprocation of the upper dies takes place. The upper section of the clutch mechanism is geared to the turret at 36 to produce its intermittent rotation, while the lower clutch-section operates, through gearing 37 and a central shaft 38, crank mechanisms 40, which intermittently reciprocate together the dies 28 and 29. The last-mentioned connections are through a mechanism X, serving to control the time during which the dies 28 and 29 are forced against the work upon the dies 27. The feeding mechanisms for supplying the blanks to be operated on to the dies form no part of the present invention and need not be described.

Figure 2:
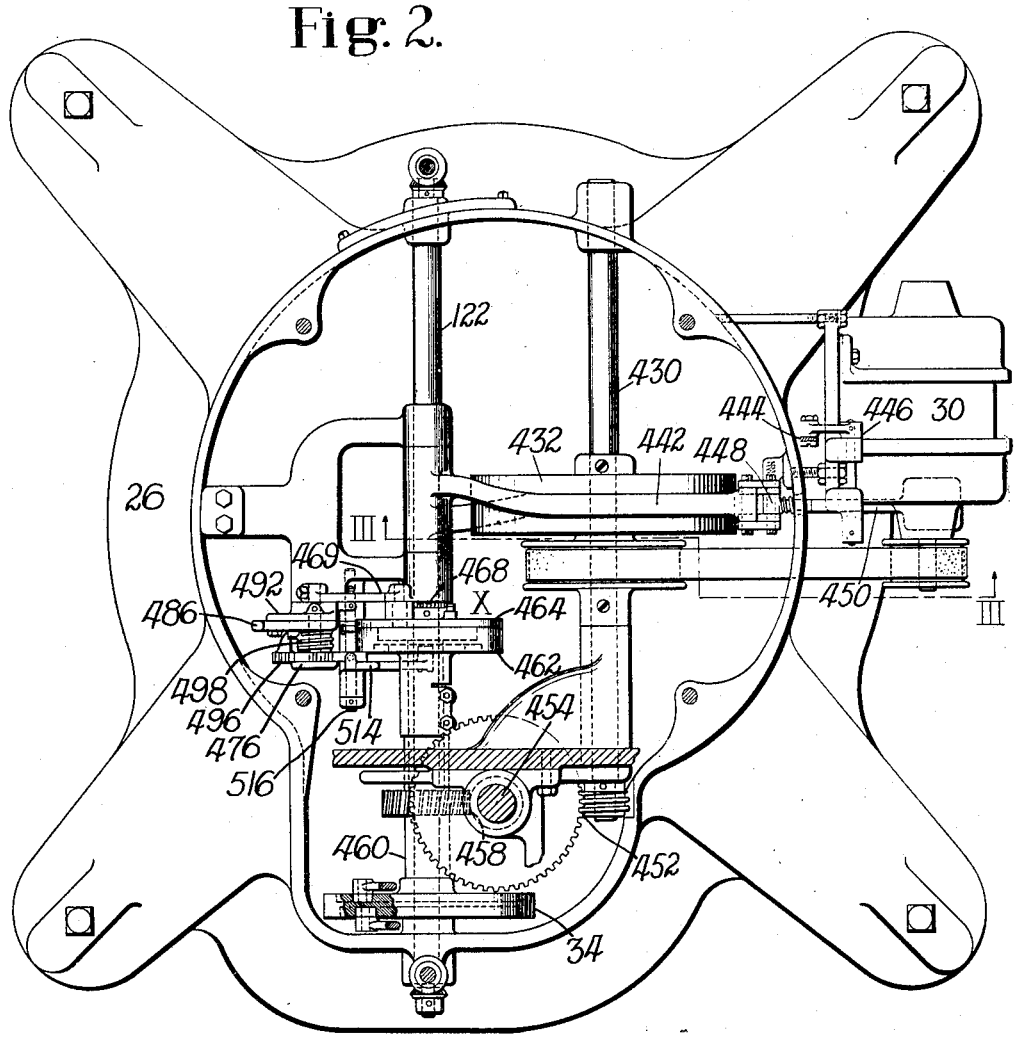
Fig. 2 is a horizontal section on the line II—II of Fig. 1.
Figure 3:
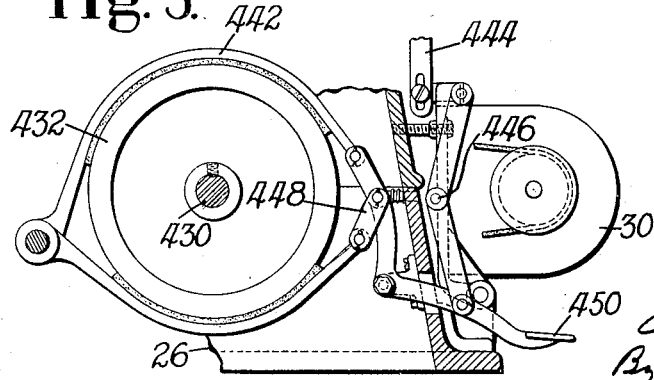
Fig. 3 is a vertical sectional detail on the line III—III of Fig. 2.

The motor 30 is shown as belted to a counter-shaft 430 (Fig. 2) journaled at the bottom of the frame and having fixed to it a fly-wheel 432. Current is delivered to the motor through a switch enclosed in a casing 434 (Fig. 1), and opened or closed by connections at 436 to a hand-lever 438 pivoted upon the frame. A like hand-lever at the opposite side of the machine is joined to 438 by a lever-and-link system 440. Simultaneously with the opening and closing of the motor-circuit, a brake-band 442 (Fig. 3) is respectively drawn against or released from the fly-wheel by a link 444 articulated to the lever 438 and operating the brake-band through toggles 446 and 448. Therefore, when the lever 438 is raised to close the switch, the brake-band is simultaneously released to free the fly-wheel, and when said lever is lowered, the brake is applied to the fly-wheel. A treadle 450 may be included in the lever-system, connecting through the toggle 448 with the band 442, so that the brake may be applied independently of the movement of the hand-lever. Worm reducing gearing 452 transmits power from the counter-shaft to a shaft 454 rotatable about a vertical axis in the frame, and to which is secured the driving member of the clutch mechanism 32. The lower driven section of the clutch is connected by spiral gearing 458 to a sleeve 460 of the time-controlling mechanism X this sleeve being rotatable about a shaft 122 journaled parallel to the shaft 430. The purpose of this mechanism is to vary the duration of the operation of the dies upon the work. As is best shown in Figs. 4 and 5, the sleeve 460 has clamped upon it an internally toothed disk 462 of a clutch of the Bliss type, the other disk 464 of which is fast upon the shaft 122 and carries a rotatable key 466 for engagement with the teeth. A spring 468, extending from an inner arm of the key to the outer face of the disk 464, exerts a force tending to so rotate the key that it will come into the path of the teeth to connect the driving member 462 with the driven member 464. The key is normally held disengaged from the disk 462, so that the disk 464 and shaft 122 are at rest, by a stop-bar 469 arranged to move into the path along which travels a tail 471 of the key. The stop-bar projects from one end of a shaft 470 rotatable within a sleeve 472 (Fig. 6) journaled in a bracket 474 mounted upon the frame. At the opposite extremity of the shaft 470 from the arm is a head 476 having a peripheral projection 478 (Fig. 4). A spring 480, joining the stop-bar 469 to the bracket, draws a projection 482 upon the stop-bar into engagement with the bracket to determine the position of the end of the bar in the path of the key-portion 471. Extending radially from a sleeve 484 turning upon the sleeve 472 is an arm 486 having a screw or other projection 488, which may be inserted in any one of a series of openings 490 formed in a plate 492 rising from the bracket parallel to the arm. Engagement of the projection with one or another of the openings alters the angular relation of a stop-projection 494 lying at the inner side of the arm 486 and serving to variably determine the normal position of a timing disk 496 fixed to the outer extremity of the sleeve 472. A helical spring 498 surrounding the sleeve 484 is secured at 500 and 502 to the arm 486 and the disk 496, respectively, and acts to draw a projection 504 at the inner side of the disk toward the stop-projection 494. Upon the outer face of the disk 496 is an actuating projection 506, which, when said disk is turned in an anti-clockwise direction, as viewed in Fig. 4 of the drawings, will strike the projection 478 upon the head 476, turning the shaft 470 to raise the stop-bar 469. This releases the key 466, allowing it to turn into engagement with the traveling teeth of the disk 462 to drive the shaft 122. Upon the periphery of the disk 496 are two sets of ratchet-teeth 508 and 510. With the first of these co-operates a pawl 512 yieldable upon the generally vertical arm of a bell-crank-lever 514 fixed to a shaft 516 rotatable in the bracket adjacent to the shaft 470. A horizontal arm of the lever 514 has a projection 518 operating in a cam-groove in the outer face of the disk 462. This groove is so formed that, in the continuous rotation of the disk, the lever is constantly oscillated, to move the pawl 512 into engagement with the teeth 508. A retaining detent 520 for engagement with the set of ratchet-teeth 510 terminates one arm of a bell-crank-lever 522 mounted to turn about the shaft 516, the other arm of which lever carries a roll 524 for contact with the periphery of the clutch-disk 464. A spring 526 acts to simultaneously draw the detent against the ratchet-teeth and the roll into contact with the disk. For the greater portion of the arc of contact between the roll and disk, the circular contour of the latter is unbroken. This so positions the lever 522 that the detent 520 is out of co-operation with the ratchet-teeth 510. During this period, the pawl 512, in its oscillation, imparts a corresponding idle oscillation to the disk 496. A relatively small peripheral portion of the disk 464 is depressed, as appears at 528 in Fig. 4. When the roll 524 arrives at this depression, the spring 526 draws the detent into engagement with the ratchet-teeth. Now when the pawl 512 acts upon the disk, each oscillation causes said disk to advance a step, this being held by the detent. The movement continues until the disk-projection 506 strikes the head-projection 478, lifting the stop-bar 469 to release the clutch-key and produce rotation of the shaft 122, as previously described. The roll 524 then rides out of the depression, releasing the disk 496 from the detent, and permitting the spring 498 to act to return the projection 504 to its position against the projection 494 upon the adjusting arm. Since, however, the portion 471 of the key has left the stop-bar, rotation of the disk 464 and the driven shaft continues, during this interval the pawl producing its idle oscillating movement of the timing disk. After the driving disk 462 has made one turn, the key arrives at the stop-bar 469 to release the disk 464 and stop the shaft 122, while the depression 528 also reaches the roll 524 to initiate another timing action of the mechanism. It will be seen that the length of the interval during which the clutch-elements are disconnected and the shaft 122 is at rest, depends upon the position of the arm 486, since this determines the initial position of the projection 504 and the arc through which the projection 506 must move to release the clutch-key from the stop-bar.

Considering the operation of the pressure means, the clutch mechanism 32 having been shifted by the cam mechanism 34, the upper section of the former is disengaged and the lower section engaged. This stops the travel of the turret and the feed of the blanks occurs. Then the ribbed dies 28 act to mold the canvas blanks to produce their sewing ribs, while the dies 29 press cemented leather blanks upon the already formed canvas blanks. At this time the disks 462 and 464 are clutched together by the key 466, and the shaft 122 is in rotation. As the end of the action of the dies under the control of the cam mechanism 34 approaches, the clutch-disk 464, in its rotation, brings the key 466 to a point at which it is disengaged from the disk 462 by contact with the bar 469, while the roll 524 enters the depression 528 in the disk 464. This stops the shaft 122 and starts the action of the time-controlling mechanism X, which determines the interval of rest of said shaft, and therefore of the cam mechanism 34 and the crank mechanisms 40 governed thereby. In this manner, the interval of pressure applied by the dies 28 and 29 to the work may be prolonged to an amount varying from a minimum, when the arm 486 is at its extreme position to the left, as seen in Fig. 4 of the drawings, to the maximum, when it is at the opposite end of the series of openings 490. In the first instance, it takes but few oscillations of the pawl 512 to bring the actuating projection 506 against the projection 478 to release the clutch-key from the stop-bar. At the other extreme, the full movement of the disk 496 is permitted, since the pawl 512 may act upon the entire series of ratchet-teeth 508, and the time of rest of the shaft 122 and the prolongation of pressure is at a maximum. Between the two limits, by adjustment of the arm 486, the duration of pressure may be chosen which will give the best results, considering the material which is under treatment. Whatever may be the time thus chosen to complete the forming and assembling of the soles, the time-intervals of the other mechanisms, as those which cause the work-feeding and turret-rotation, remain unchanged, so that no ineffective delay is introduced into the cycle. When the shaft 122 and cam mechanism again start in rotation, the latter operates to disengage the lower section of the clutch mechanism 32, terminating the cycle.

Having described my invention, what I claim as new and desire to secure by Letters Patent of the United States is:

1. The combination with rotatable connecting mechanism, of a disconnecting member arranged to act upon the connecting mechanism, and means arranged to free the connecting mechanism from the disconnecting member after a predetermined interval.

2. The combination with rotatable connecting mechanism, of a disconnecting member arranged to act upon the connecting mechanism, means arranged to free the connecting mechanism from the disconnecting member after a predetermined interval, and means arranged to vary such interval.

3. The combination with connecting mechanism, of a disconnecting member arranged to act upon the connecting mechanism, and means carried by the connecting mechanism to free said mechanism from the disconnecting member.

4. The combination with rotatable clutch mechanism, of a disconnecting member arranged to act periodically upon the clutch mechanism, and means arranged to free the clutch mechanism from the disconnecting member after a predetermined interval.

5. The combination with rotatable clutch mechanism, of a disconnecting member arranged to act periodically upon the clutch mechanism, means arranged to free the clutch mechanism from the disconnecting member after a predetermined interval, and means arranged to vary such interval.

6. The combination with rotatable clutch mechanism, of a disconnecting member arranged to act periodically upon the clutch mechanism, and means operable in the rotation of the clutch mechanism to free said mechanism from the disconnecting member.

7. The combination with rotatable clutch members, of a disconnecting member co-operating therewith, and ratchet mechanism arranged to free the clutch mechanism from the disconnecting member at predetermined times.

8. The combination with rotatable clutch members, of a disconnecting member co-operating therewith, ratchet mechanism arranged to free the clutch mechanism from the disconnecting member at predetermined times, and means arranged to vary the relation of an element of the ratchet mechanism to change the time of disconnection.

9. A combination with rotatable clutch members, of a connecting member therefor, a movable disconnecting member with which the connecting member may contact, and actuating means for moving the disconnecting member into the path of the connecting member after a predetermined time.

10. A combination with rotatable clutch members, of a connecting member therefor, a movable disconnecting member with which the connecting member may contact, and an actuating means for the disconnecting member movable through different distances to affect such actuation.

11. A combination with rotatable clutch members, of a connecting member therefor, a movable disconnecting member with which the connecting member may contact, and actuating means for moving the disconnecting member into the path of the connecting member after a predetermined time.

12. The combination with rotatable clutch members, of a key for connecting the members, a disconnecting member acting upon the key in the movement of the clutch members, a ratchet-wheel carrying means to separate the disconnecting member from the key, a pawl co-operating with the ratchet-wheel, means for constantly oscillating the pawl, and means for periodically rendering the pawl effective to rotate the ratchet-wheel.

13. The combination with rotatable clutch members, of a key for connecting the members, a disconnecting member acting upon the key in the movement of the clutch members, a ratchet-wheel carrying means to separate the disconnecting member from the key, a pawl co-operating with the ratchet-wheel, means for constantly oscillating the pawl, means for periodically rendering the pawl effective to rotate the ratchet-wheel, and means for fixing the separating means of the ratchet-wheel in different angular positions.

14. The combination with rotatable clutch members, of a disconnecting member co-operating therewith, ratchet mechanism movable to free the clutch mechanism from the disconnecting member and including a retaining detent, and means arranged to render the detent and therefore the ratchet mechanism effective periodically.

In testimony whereof I have signed my name to this specification.

ERIC A. HOLMGREN.